(12) United States Patent
Marsh et al.

(10) Patent No.: US 8,168,721 B2
(45) Date of Patent: *May 1, 2012

(54) COATING COMPOSITIONS CONTAINING TETRAMETHYL CYCLOBUTANEDIOL

(75) Inventors: Stacey James Marsh, Church Hill, TN (US); Angela Hartley Honeycutt, Johnson City, TN (US); Deepanjan Bhattacharya, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 69 days.

This patent is subject to a terminal disclaimer.

(21) Appl. No.: 12/367,113

(22) Filed: Feb. 6, 2009

(65) Prior Publication Data

US 2010/0204363 A1 Aug. 12, 2010

(51) Int. Cl.
*C08L 67/02* (2006.01)
*C08G 63/181* (2006.01)

(52) U.S. Cl. ........ 525/173; 525/174; 525/176; 525/445; 525/448; 528/302

(58) Field of Classification Search ................. 525/173, 525/174, 176, 445, 448; 528/302
See application file for complete search history.

(56) References Cited

U.S. PATENT DOCUMENTS

| | | | |
|---|---|---|---|
| 2,891,930 A | 6/1959 | Caldwell et al. | |
| 3,227,764 A | 1/1966 | Martin et al. | |
| 3,313,777 A | 4/1967 | Elam et al. | |
| 3,484,339 A * | 12/1969 | Caldwell | 428/480 |
| 3,502,620 A | 3/1970 | Caldwell | |
| 3,538,187 A | 11/1970 | Feltzen | |
| 3,789,044 A | 1/1974 | Taft et al. | |
| 3,856,830 A | 12/1974 | Kuehn | |
| 4,074,061 A | 2/1978 | Musser | |
| 4,076,766 A | 2/1978 | Simms | |
| 4,267,279 A | 5/1981 | Howell | |
| 4,299,933 A | 11/1981 | McConnell et al. | |
| 4,322,508 A | 3/1982 | Peng et al. | |
| 4,338,379 A | 7/1982 | Strolle et al. | |
| 4,350,807 A | 9/1982 | McConnell et al. | |
| 4,363,908 A | 12/1982 | Joyner et al. | |
| 4,397,989 A | 8/1983 | Adesko | |
| 4,480,077 A | 10/1984 | Hefner, Jr. | |
| 4,525,504 A | 6/1985 | Morris et al. | |
| 4,525,544 A | 6/1985 | Nelson et al. | |
| 4,581,093 A * | 4/1986 | Noyes et al. | 156/307.3 |
| 4,585,854 A | 4/1986 | Tung et al. | |
| 4,724,173 A | 2/1988 | Rockett et al. | |
| 4,859,760 A | 8/1989 | Light, Jr. et al. | |
| 4,910,292 A | 3/1990 | Blount | |
| 4,939,233 A | 7/1990 | Jenkins et al. | |
| 4,959,259 A | 9/1990 | Guilbaud | |
| 5,017,679 A | 5/1991 | Chang et al. | |
| 5,023,367 A | 6/1991 | Calbo, Jr. et al. | |
| 5,025,086 A | 6/1991 | Blount, Jr. et al. | |
| 5,097,006 A | 3/1992 | Kapilow et al. | |
| 5,124,388 A | 6/1992 | Pruett et al. | |
| 5,160,792 A | 11/1992 | Barbee et al. | |
| 5,245,002 A | 9/1993 | Kuo | |
| 5,254,637 A | 10/1993 | Witzeman et al. | |
| 5,256,759 A | 10/1993 | Kuo | |
| 5,256,761 A | 10/1993 | Blount, Jr. | |
| 5,306,567 A | 4/1994 | Kuo et al. | |
| 5,344,872 A | 9/1994 | Debord et al. | |
| 5,371,148 A | 12/1994 | Taylor et al. | |
| 5,393,609 A | 2/1995 | Chang et al. | |
| 5,393,840 A | 2/1995 | Kuo | |
| 5,397,641 A | 3/1995 | Moens et al. | |
| 5,416,187 A | 5/1995 | Kuo et al. | |
| 5,439,988 A | 8/1995 | Moens et al. | |
| 5,464,909 A | 11/1995 | Chang et al. | |
| 5,498,668 A | 3/1996 | Scott | |
| 5,554,701 A | 9/1996 | Chang et al. | |
| 5,596,037 A | 1/1997 | Moens et al. | |
| 5,646,237 A | 7/1997 | George et al. | |
| 5,852,120 A | 12/1998 | Bederke | |
| 5,955,565 A * | 9/1999 | Morris et al. | 528/271 |
| 6,087,464 A | 7/2000 | Swarup et al. | |
| 6,120,851 A | 9/2000 | Borgholte et al. | |
| 6,248,843 B1 | 6/2001 | Panandiker et al. | |
| 6,265,072 B1 * | 7/2001 | Fagerburg | 428/412 |
| 6,423,816 B1 | 7/2002 | Wamprecht et al. | |
| 6,887,937 B1 | 5/2005 | Vandevoorde et al. | |

(Continued)

FOREIGN PATENT DOCUMENTS

BE 615850 7/1962

(Continued)

OTHER PUBLICATIONS

International Search Report and Written Opinion for PCT/US2010/000212 dated Apr. 7, 2010.
International Search Report and Written Opinion for PCT/US2010/000213 dated Apr. 8, 2010.
International Search Report and Written Opinion for PCT/US2010/000214 dated Apr. 7, 2010.
International Search Report and Written Opinion for PCT/US2010/000215 dated Apr. 7, 2010.
International Search Report and Written Opinion for PCT/US2010/000216 dated Mar. 19, 2010.

(Continued)

*Primary Examiner* — Randy Gulakowski
*Assistant Examiner* — Mike M Dollinger
(74) *Attorney, Agent, or Firm* — Eric D. Middlemas; Jennifer R. Knight; Bernard J. Graves, Jr.

(57) ABSTRACT

Disclosed are solvent borne thermosetting coating compositions that contain a curable polyester resin blended with an acrylic copolymer, a crosslinker, and a solvent. The polyester resin contains 2,2,4,4-tetramethyl-1,3-cyclobutanediol and exhibits good dry time, compatibility with acrylic resins, sag resistance and hardness development in a coating composition. The coating compositions can be used to prepare clear coat or pigmented coatings for automotive OEM, auto refinish, and other applications.

22 Claims, No Drawings

U.S. PATENT DOCUMENTS

| | | |
|---|---|---|
| 6,995,194 B2 | 2/2006 | Moens et al. |
| 7,087,672 B2 | 8/2006 | Yuan et al. |
| 7,141,625 B2 | 11/2006 | Komazaki et al. |
| 2001/0051706 A1 | 12/2001 | George et al. |
| 2002/0103329 A1* | 8/2002 | Koldijk et al. ............ 528/302 |
| 2004/0024140 A1 | 2/2004 | Fujita et al. |
| 2006/0079650 A1 | 4/2006 | Stevenson et al. |
| 2006/0286383 A1 | 12/2006 | Gilmer |
| 2007/0020557 A1 | 1/2007 | Yao et al. |
| 2007/0092746 A1 | 4/2007 | Wayton et al. |
| 2007/0232778 A1 | 10/2007 | Moody et al. |
| 2008/0139687 A1 | 6/2008 | Woods et al. |

FOREIGN PATENT DOCUMENTS

| | | |
|---|---|---|
| EP | 1647564 | 4/2006 |
| GB | 1044015 | 9/1966 |
| GB | 1130558 | 10/1968 |
| WO | 9412557 | 6/1994 |
| WO | 9501407 | 1/1995 |
| WO | 9633229 | 10/1996 |
| WO | 2006083343 | 8/2006 |
| WO | 2006138198 | 12/2006 |
| WO | 2007078851 | 7/2007 |

OTHER PUBLICATIONS

Copending U.S. Appl. No. 12/367,151, filed Feb. 6, 2009.
Copending U.S. Appl. No. 12/367,190, filed Feb. 6, 2009.
Copending U.S. Appl. No. 12/367,202, filed Feb. 6, 2009.
Copending U.S. Appl. No. 12/367,133, filed Feb. 6, 2009.
USPTO Office Action dated Aug. 20, 2010 for U.S. Appl. No. 12/367,202.
USPTO Office Action dated Nov. 30, 2010 for U.S. Appl. No. 12/367,190.
USPTO Office Action dated Nov. 30, 2010 for U.S. Appl. No. 12/367,151.
USPTO Office Action dated Mar. 7, 2011 for U.S. Appl. No. 12/367,202.
USPTO Office Action dated Mar. 18, 2011 for U.S. Appl. No. 12/367,151.
USPTO Office Action dated Mar. 21, 2011 for U.S. Appl. No. 12/367,190.
USPTO Office Action dated Jun. 23, 2011 for U.S. Appl. No. 12/367,202.
USPTO Office Action dated Nov. 7, 2011 for U.S. Appl. No. 12/367,202.

* cited by examiner

COATING COMPOSITIONS CONTAINING TETRAMETHYL CYCLOBUTANEDIOL

FIELD OF THE INVENTION

The invention pertains to thermosetting coating compositions. More particularly, this invention pertains to thermosetting coating compositions comprising a curable polyester containing 2,2,4,4-tetramethyl-1,3-cyclobutanediol, an acrylic copolymer, a crosslinker, and a solvent.

DETAILED DESCRIPTION

Acrylics and polyesters are common types of resins used in the manufacture of solvent borne thermosetting coatings. Acrylics are known for their excellent hardness, fast dry times, scratch, stain, chemical, and humidity resistance, and outdoor durability. Acrylic coatings, however, often lack flexibility and require large amounts of solvent in the coating formulation to achieve a practical application viscosity. The high solvent requirement for acrylics makes it difficult to satisfy coating VOC ("volatile organic compound") content regulations as mandated by various federal and state air quality organizations.

By contrast, polyesters are ideally suited to formulate low VOC content or "high solids" coatings and provide a good balance of performance properties. Polyesters, however, typically do not weather as well as acrylics. Blends of acrylic and polyester resins can be used to achieve high solids solvent-borne thermosetting coatings with desirable properties. Some illustrative examples of coating compositions comprising blends of acrylic and polyester resins are the subject of U.S. Pat. Nos. 4,076,766; 4,322,508; 4,338,379; 4,397,989; 4,751,267; and 4,716,200.

Polyester resins can be used to replace a portion of the acrylic resin in a coating formulation to improve certain performance properties. For example, the presence of a polyester may help lower VOC content, increase gloss, improve the flexibility of the coating, or a combination of one or more of these properties. The polyester, however, also may have the undesirable effect of slowing dry time. Sag resistance, hardness and hardness related properties of the coating may be compromised as well.

For example, polyester resins containing neopentyl glycol (abbreviated herein as "NPG") and high levels of isophthalic acid (abbreviated herein as "IPA") generally exhibit good gloss, hardness, stain resistance and chemical resistance. Polyesters with high IPA content, however, exhibit poor compatibility when blended with acrylic resins.

Incompatibility of polyester/acrylic blends will manifest itself through phase separation, precipitation of the resins from solution and varying degrees of poor clarity that range from opaque to hazy solutions. These conditions are highly undesirable and result in poor storage stability of the resin solution and the coating formulated therefrom. The coating may experience a viscosity increase, phase separation, agglomeration of ingredients, etc., that will result in a higher application viscosity, poor appearance and poor mechanical properties of the cured film.

The compatibility of the polyester sometimes can be improved by incorporating various modifying diols, dicarboxylic acids, and anhydrides in the resin formulation. Examples of these modifying diols and dicarboxylic acids include 1,6-hexanediol (abbreviated herein as "HD"), 2,2,4-trimethyl-1,3-pentanediol (abbreviated herein as "TMPD"), 2-butyl-2-ethyl-1,3-propanediol (abbreviated herein as "BEPD"), adipic acid (abbreviated herein as "AD"), 1,4-cyclohexanedicarboxylic acid (abbreviated herein as "CHDA"), and hexahydrophthalic anhydride (abbreviated herein as "HHPA"). Although these monomers can improve compatibility, they often produce polyesters that slow dry time, lower sag resistance and decrease coating hardness and the desirable properties associated with higher hardness.

Polyester resins are needed, therefore, that form compatible blends with acrylic resins yet maintain the desirable hardness properties exhibited by the acrylic resins alone in high solids coating compositions. We have found that polyester resins prepared from 2,2,4,4-tetramethyl-1,3-cyclobutanediol exhibit good compatibility with acrylic resins, even in the presence of high aromatic dicarboxylic acid content.

The present invention provides a solvent-borne thermosetting coating composition comprising a curable polyester prepared from 2,2,4,4-tetramethyl-1,3-cyclobutanediol, an acrylic copolymer, a crosslinker and a solvent. Therefore, in one embodiment, our invention provides a thermosetting coating composition, comprising:

(A). about 2 to about 50 weight percent, based on the total weight of (A), (B), and (C) of a curable polyester, comprising
  i. diacid residues, comprising about 20 to 100 mole percent, based on the total moles of diacid residues, of the residues of isophthalic acid and about 80 to about 0 mole percent of the residues of adipic acid;
  ii. diol residues, comprising about 10 to 100 mole percent, based on the total moles of diol residues, of the residues of 2,2,4,4-tetramethyl-1,3-cyclobutanediol; and
  iii. about 2 to about 40 mole percent of the residues of at least one polyol, based on the total moles of diol and polyol residues;
  wherein the curable polyester has a number average molecular weight of about 500 to about 10,000 daltons, a glass transition temperature of about −35° C. to about 100° C., a hydroxyl number of about 20 to about 300 mg KOH/g of polyester, and an acid number of 0 to about 80 mg KOH/g of polyester;

(B). about 25 to about 88 weight percent, based on the total weight of (A), (B), and (C) of at least one acrylic copolymer of ethylenically unsaturated monomers comprising at least one hydroxyl, epoxy, carboxyl, blocked phenol, or acetoacetoxy functional group; and (C). about 10 to about 50 weight percent, based on the total weight of (A), (B), and (C), of at least one crosslinker comprising at least one compound reactive with a carboxylic acid or a hydroxyl group;

(D). about 10 to about 60 weight percent, based on the total weight of (A), (B), (C), and (D) of at least one nonaqueous solvent.

The coating compositions of our invention exhibit an improvement in dry time, sag resistance and hardness development in comparison to an acrylic blended with typical polyester resin formulations such as, for example, those containing NPG/IPA, or commercially available polyesters recommended for such applications. Our coating compositions may be used to prepare clear coat or pigmented coatings used in auto OEM, auto refinish, transportation, aerospace, maintenance, marine, machinery and equipment, general metal, appliance, metal furniture, plastic and building/construction coating applications.

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to a plurality of polyesters, dicarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

The term "curable polyester", as used herein, is synonymous with the term "resin" and intended to mean a thermosetting surface coating polymer prepared by the polycondensation of one or more acid components, diol components, and polyol components. The curable polyester of the present invention is a thermoset polymer and is particularly suitable as a resin for solvent-based coatings. This polyester has a low molecular weight, typically about 500 to about 10,000 daltons, and would not be suitable for the fabrication of films, sheets, and other shaped objects by extrusion, casting, blow molding, and other thermoforming processes commonly used for high molecular weight thermoplastic polymers. The polyester has reactive functional groups, typically hydroxyl groups or carboxyl groups for the purpose of later reacting with crosslinkers in a coating formulation. The functional group is controlled by having either excess diol or acid (from dicarboxylic acid or tricarboxylic acid) in the polyester resin composition. The desired crosslinking pathway will determine whether the polyester resin will be hydroxyl-terminated or carboxylic acid-terminated. The concept is known to those skilled in the art and described, for example, in *Organic Coatings Science and Technology*, 2nd ed., p. 246-257, by Z. Wicks, F. Jones, and S. Pappas, Wiley, New York, 1999.

Typically, the acid component comprises at least one dicarboxylic acid and may, optionally, include mono- and polybasic carboxylic acids. For example, the curable polyester may be prepared from an acid component comprising an aromatic dicarboxylic acid such as, for example, isophthalic acid, an aliphatic or cycloaliphatic dicarboxylic acid such as, for example, adipic acid or 1,3-cyclohexanedicarboxylic acid, or a mixture of one or more aromatic, aliphatic, and cycloaliphatic acids. The diol component may comprise one or more aliphatic cycloaliphatic diols such as, for example, 2,2,4,4-tetramethyl-1,3-cyclobutanediol, linear or branched aliphatic diols such as, for example, neopentyl glycol, or aromatic diols such as, for example, p-xylenediol. Catalysts may be used to accelerate the rate of the polycondensation reaction. Additional examples of each of the components of the curable polyester include those known in the art, including those discussed below and in various documents known in the art such as, for example, in *Resins for Surface Coatings*, Vol. III, p. 63-167, ed. by P. K. T. Oldring and G. Hayward, SITA Technology, London, UK, 1987.

The term "residue", as used herein in reference to the polymers of the invention, means any organic structure incorporated into a polymer through a polycondensation or ring opening reaction involving the corresponding monomer. It will also be understood by persons having ordinary skill in the art, that the residues associated within the various curable polyesters of the invention can be derived from the parent monomer compound itself or any derivative of the parent compound. For example, the dicarboxylic acid residues referred to in the polymers of the invention may be derived from a dicarboxylic acid monomer or its associated acid halides, esters, salts, anhydrides, or mixtures thereof. Thus, as used herein, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a curable polyester.

The term "nonaqueous solvent" is intended to mean a solvent or mixture of solvents made up substantially of one or more organic liquids. The nonaqueous solvents of the present invention will typically contain 30 weight percent or less water, based on the total weight of the solvent. Other examples of non-aqueous solvents include solvents containing 20 weight percent or less, 10 weight percent or less, and 5 weight percent or less of water.

The thermosetting coating composition of the present invention comprises about 2 to about 50 weight percent, based on the total weights of components (A), (B), and (C), of a curable polyester that, in turn, comprises the an acid component, a diol component, and a polyol component. The acid component comprises the residues of an aromatic dicarboxylic acid, an acyclic aliphatic dicarboxylic acid, an alicyclic dicarboxylic acid, or a combination thereof; the diol component comprises the residues of 2,2,4,4-tetramethyl-1,3-cyclobutanediol. For example, in a general embodiment, the curable polyester comprises:

i. diacid residues, comprising about 20 to 100 mole percent, based on the total moles of diacid residues, of the residues of at least one aromatic diacid and about 80 to 0 mole percent of the residues of at least one aliphatic diacid, alicyclic diacid, or a combination thereof;

ii. diol residues, comprising about 10 to 100 mole percent, based on the total moles of diol residues, of the residues of 2,2,4,4-tetramethyl-1,3-cyclobutanediol; and iii. about 2 to about 40 mole percent of the residues of at least one polyol, based on the total moles of diol and polyol residues;

wherein the curable polyester has a number average molecular weight of about 500 to about 10,000 daltons, a glass transition temperature of about −35° C. to about 100° C., a hydroxyl number of about 10 to about 300 mg KOH/g of polyester, and acid number of 0 to about 80 mg potassium hydroxide KOH/g of polyester.

The curable polyester can comprise about 20 to 100 percent, based on the total moles of diacid residues, of the residues of at least one aromatic diacid. Examples of aromatic diacids included, but are not limited to, phthalic acid, terephthalic acid, isophthalic acid, 2,6-naphthalenedicarboxylic acid, or combinations thereof. The 1,4-, 1,5-, and 2,7-isomers of naphthalenedicarboxylic acid or mixtures therof may be used in addition to the 2,6-isomer. In addition, to the aromatic diacid residues, the curable polyester can comprise about 80 to 0 mole percent of the residues of an acyclic aliphatic or alicyclic diacid such as, for example, adipic acid, dodecanedioic acid, sebacic acid, azelaic acid, glutaric acid, maleic acid, fumaric acid, succinic acid, 1,4-cyclohexanedicarboxylic acid, 1,3-cyclohexanedicarboxylic acid, hexahydrophthalic acid, tetrahydro-phthalic acid, or combinations thereof. If cis and trans isomers are possible, the alicyclic diacid may be used as the pure cis, trans isomer or mixtures of cis-trans isomers. Some additional, non-limiting examples of the diacid component that the curable polyester can comprise are as follows: (a) about 30 to 100 mole percent of the residues of isophthalic acid; (b) about 30 to 100 mole percent of the residues of isophthalic acid and about 70 to 0 mole percent of the residues of an aliphatic diacid; and (c) about 30 to 100 mole percent of the residues of isophthalic acid and about 70 to 0 mole percent of the residues of an aliphatic diacid having 8 carbons or less.

In another example, the curable polyester can comprise about 20 to about 80 mole percent, based on the total moles of diacid residues, of the residues of isophthalic acid and about 80 to about 20 mole of the residues of adipic acid. In another example, the diacid residues comprise about 30 to about 70 mole percent of the residues of isophthalic acid, about 70 to about 30 mole percent adipic acid. In still another example, the diacid residues can comprise about 40 to about 60 mole percent of the residues of isophthalic acid and about 60 to about 40 mole percent of the residues of adipic acid. In addition to the residues of isophthalic and adipic acids, the diacid residues may further comprise up to 30 mole percent of the residues of at least one dicarboxylic acid chosen from phthalic acid, terephthalic acid, tetrachlorophthalic acid, dodecanedioic acid, sebacic acid, azelaic acid, 1,4-cyclohexanedicarboxylic acid, 1,3-cyclohexanedicarboxylic acid, hexahydrophthalic acid, tetrahydrophthalic acid, maleic acid, fumaric acid, succinic acid, 2,6-naphthalenedicarboxylic acid, and glutaric acid.

In addition to the dicarboxylic residues described above, the acid component of our inventive polyester composition may further comprise the residues of a monocarboxylic acid or polybasic acid containing more than 2 carboxylic acid groups. For example, the polyester may comprise residues chosen from benzoic acid, acetic acid, propionic acid, tert-butyl benzoic acid, butanoic acid, trimellitic anhydride, or a mixture thereof.

The curable polyester also comprises about 10 to 100 mole percent, based on the total moles of diol residues, of the residues of 2,2,4,4-tetramethyl-1,3-cyclo-butanediol (abbreviated herein as "TMCD"). The TMCD may be used as the pure cis and trans isomer or as a mixture of cis-trans isomers. Other examples of TMCD residue content in the curable polyester are about 20 to 100 mole percent, about 30 to about 70 mole percent, about 40 to about 60 mole percent, and about 50 mole percent. The curable polyester optionally may comprise up to 90 mole percent of the residues other diols in combination with TMCD such as, for example, neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexane-dimethanol, 1,3-cyclohexanedimethanol, 1,4-cyclohexanedimethanol, 2,2,4-trimethyl 1,3-pentanediol, p-xylenediol, hydroxypivalyl hydroxypivalate, 1,10-decanediol and hydrogenated bisphenol A. For example, the curable polyester resins may comprise the residues of neopentyl glycol in combination with TMCD.

The curable polyester comprises about 2 to about 40 mole percent of the residues of at least one polyol, based on the total moles of diol and polyol residues. These polyols may include acyclic aliphatic, alicyclic, and aryl alkyl polyols. Some specific examples of polyols include, but are not limited to, trimethylolpropane (TMP), pentaerythritol (PE), trimethylolethane (TME), erythritol, threitol, dipentaerythritol, sorbitol, glycerine, and the like. In one example, the curable polyester can comprise about 3 to about 30 mole percent of the residues of at least one polyol selected from trimethylolpropane, pentaerythritol, trimethylolethane, erythritol, threitol, dipentaerythritol, sorbitol, and glycerine. In another embodiment, the curable polyester comprises trimethylolpropane.

The curable polyester of this invention has a hydroxyl number of about 10 to about 300 mg KOH/g resin. Further examples of hydroxyl number are about 20 to about 275, and about 30 to about 250. The curable polyester has an acid number of about 0 to about 50 mg KOH/g resin or, in other examples, about 2 to about 25, and about 2 to about 15. The curable polyester has a number average molecular weight of about 400 daltons to about 10,000 daltons. Additional examples of molecular weight ranges are about 600 to about 7000, and about 800 to about 5000. The curable polyester can have a glass transition temperature (abbreviated herein as "Tg") of about −35° C. to about 100° C. Other representative examples of Tg ranges for the curable polyester are about −35 to about 80° C., about −35 to about 50° C., about −20 to about 50° C., about −35 to less than 50° C., about −35 to about 49° C., about −35 to about 48° C., about −35 to about 47° C., about −35 to about 46° C., about −35 to about 45° C., about −35 to about 40° C.

Other representative compositions of the curable polyesters of the present invention are those comprising: (a) about 20 to about 80 mole percent, based on the total moles of diacid residues, of the residues of isophthalic acid and about 80 to about 20 mole of the residues of adipic acid; about 20 to 100 mole percent, based on the total moles of diol residues, of the residues of 2,2,4,4-tetramethyl-1,3-cyclobutanediol; and about 2 to about 40 mole percent of the residues of a polyol, based on the total moles of diol and polyol residues in which the curable polyester has a number average molecular weight of about 500 to about 10,000 daltons, a glass transition temperature of about −35° C. to about 100° C., a hydroxyl number of about 20 to about 300 mg KOH/g of polyester, and an acid number of 0 to about 80 mg KOH/g of polyester; and (b) about 20 to 80 mole percent of the residues of isophthalic acid, about 80 to about 20 mole percent of the residues of adipic acid, and 0 to about 30 mole percent of the residues of at least one dicarboxylic acid chosen from phthalic acid, terephthalic acid, tetrachlorophthalic acid, dodecanedioic acid, sebacic acid, azelaic acid, 1,4-cyclohexanedicarboxylic acid, 1,3-cyclohexanedicarboxylic acid, hexahydrophthalic acid, tetrahydrophthalic acid, maleic acid, fumaric acid, succinic acid, 2,6-naphthalenedicarboxylic acid, and glutaric acid; and diol residues comprising about 20 to 100 mole percent of the residues of 2,2,4,4-tetramethyl-1,3-cyclobutanediol. This polyester should be understood to include the various embodiments of diacids, diols, polyols, acid and hydroxyl numbers, and glass transition temperatures described previously. For example, the curable polyester may comprise about 40 to about 60 mole percent of the residues of 2,2,4,4-tetramethyl-1,3-cyclobutanediol, about 60 to 40 mole percent of the residues of neopentyl glycol and about 2 to about 40 mole percent of the residues of at least one polyol chosen from trimethylolpropane, pentaerythritol, trimethylolethane, erythritol, and dipentaerythritol. In another example, the diacid component can comprise about 30 to about 70 mole percent of isophthalic acid and about 70 to about 30 mole percent of adipic acid, and the diol component can comprise about 20 to 100 mole percent 2,2,4,4-tetramethyl-1,3-cyclobutanediol. In yet another example, the curable polyester can comprise about 50 to about 100 mole percent of the residues of isophthalic acid, 0 to about 50 mole percent of the residues of adipic acid, about 100 mole percent of the residues of 2,2,4,4-tetramethyl-1,3-cyclobutanediol, and about 10 mole percent of the residues of trimethylolpropane. In this embodiment, the curable polyester can have a hydroxyl number of about 30 to about 250 mg potassium hydroxide per gram of polyester, an acid number of about 2 to about 15 mg potassium hydroxide per gram of polyester, a number average molecular weight of about 700 to about 7000 daltons, and a Tg of about −20 to about 50° C. In still another example, the curable polyester may comprise about 50 mole percent of the residues of isophthalic acid, about 50 mole percent of the residues of adipic acid, about 50 mole percent of the residues of 2,2,4,4-tetramethyl-1,3-cyclobutanediol, about 50 mole percent of the residues of neopentyl glycol, and about 10 mole percent of the residues of trimethylolpropane.

The curable polyester also may further comprise the residues of a monocarboxylic acid chosen from benzoic acid, acetic acid, propionic acid, tert-butyl benzoic acid, and butanoic acid, trimellitic anhydride, or a mixture thereof. In yet another example, the polyester of the invention may have a hydroxyl number of about 30 to about 250 mg potassium hydroxide per gram of polyester, an acid number of about 2 to about 15 mg potassium hydroxide per gram of polyester, and a number average molecular weight of about 700 to about 7000 daltons, and a Tg of about −20 to about 75° C.

The curable polyester component can be prepared by heating the reactants until the desired molecular weight, acid number, or hydroxyl number is reached. Typically, the reactants are heated at a temperature of about 150 to about 250° C. while recovering water from the mixture to produce a curable polyester polyester having number average molecular weight of about 500 to about 10,000 daltons, a glass transition temperature of about −35° C. to about 100° C., a hydroxyl number of about 20 to about 300 mg potassium hydroxide/g of polyester, or an acid number of 0 to about 80 mg potassium hydroxide/g of polyester.

The reaction can be monitored by the collection of water (direct condensation) or alcohol (ester inter-change). The polyester typically is be prepared at a temperature range of about 150-250° C. and can be conducted at atmospheric pressure or under vacuum. In another example, the diacid and diol components of the polyester may be partially reacted before the polyol is added. Once the polyol is added to the reaction mixture, heating is continued until a target acid number is satisfied.

Alternatively, the curable polyester can be prepared in the presence of a process solvent to help remove the water of esterification and to promote the synthesis of the polyester resin. The process solvent may be any process solvent known in the art used in the formation of a polyester resin. For example, the process solvent can be a hydrocarbon solvent. In another example, the process solvent can comprise an aromatic hydrocarbon, such as, for example, xylene. The xylene can be a pure isomer, or a mixture of ortho, meta, and para isomers. The amount of process solvent can be determined by routine experimentation as would be understood by those skilled in the art. The process solvent can be added in amounts ranging from about 0.5 to about 5 weight percent, based on the total weight of reaction mixture.

Optionally, a catalyst may be used to promote the synthesis of the polyester. The catalyst may be any catalyst known in the art useful for the formation of polyester polymers. For example, the catalyst can be a tin catalyst, such as, for example, Fascat 4100™ (available from Arkema Corporation). The amount of catalyst added may be determined by routine experimentation as understood by those skilled in the art. Preferably, a catalyst is added in amounts ranging from about 0.01 to about 1.00 weight % based on the amount of reactants.

The coating composition also comprises about 25 to about 88 weight percent, based on the total weight of components (A), (B), and (C) of at least one acrylic copolymer of ethylenically unsaturated monomers comprising at least one hydroxyl, epoxy, carboxyl, blocked phenol, or acetoacetoxy functional group. Thermosetting acrylic resins are typically prepared by free radical polymerization in bulk or in a solvent. Representative free-radical initiators include, but are not limited to, organic peroxides or azo compounds, such as benzoyl peroxide, t-butyl hydroperoxide, t-butyl peroxide, t-butyl peroxybenzoate, azobisisobutyronitrile, and 2,2'-azobis(2,4-dimethyl)-valeronitrile. The reaction is preferably carried out at the reflux temperature of the solvent used, which is generally higher than the thermal decomposition temperature of the initiator employed. Suitable examples of preparation methods and components of the acrylic resin include those known in the art including, but not limited to, those described above, and in *Resins for Surface Coatings*, Vol. II, p. 121-210, ed. by P. K. T. Oldring and G. Hayward, SITA Technology, London, UK, 1987.

The acrylic resin comprises acrylic monomers copolymerized with other ethylenically unsaturated monomers that contain reactive functional groups as listed above. Some common examples of acrylic monomers acrylate esters, methacrylate esters, (meth)acrylic acid, and acrylamide monomers. Examples of ethylenically unsaturated monomers include, but are not limited to, mono- and dicarboxylic unsaturated acids, allylic monomers, and vinyl compounds such as, for example, vinyl aromatic hydrocarbons, vinyl aliphatic hydrocarbons, vinyl ethers, and vinyl esters. Mono- and dicarboxylic unsaturated acids include fumaric acid, maleic acid or anhydride, haconic acid, citraconic acid, mesaconic acid, muconic acid, glutaconic acid, aconitic acid, hydrosorbic acid, sorbic acid, α-chlorsorbic acid, cinnamic acid, and hydromuconic acid as well as esters of such acids. Examples of vinyl aromatic hydrocarbons include styrene, methyl styrenes and similar lower alkyl styrenes, chlorostyrene, vinyl toluene, vinyl naphthalene, and divinyl benzoate. Vinyl aliphatic hydrocarbon monomers include α-olefins such as ethylene, propylene, isobutylene, and cyclohexene as well as conjugated dienes such as 1,3-butadiene, methyl-2-butadiene, 1,3-piperylene, 2,3 dimethyl butadiene, isoprene, cyclopentadiene, and dicyclopentadiene. Some representative examples of vinyl esters include vinyl acetate, vinyl propionate, vinyl butyrates, vinyl benzoates, vinyl isopropyl acetates and similar vinyl esters. Vinyl alkyl ethers include methyl vinyl ether, isopropyl vinyl ether, n-butyl vinyl ether, and isobutyl vinyl ether.

Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl an cresyl glycidyl ethers reacted with acrylic and methacrylic acids, hydroxyl alkyl acrylates and methacrylate such as hydroxyethyl and hydroxypropyl acrylates and methacrylates, as well as amino acrylates and methacrylates. Acrylic acids include acrylic and methacrylic acid, ethacrylic acid, α-chloracrylic acid, α-cycanoacrylic acid, crotonic acid, β-acryloxy propionic acid, and β-styrl acrylic acid. Examples of acrylamide monomers include, but are not limited to, acrylamides or methacrylamides such as N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or isobutyl alkyl groups. In one embodiment, for example, the ethylenically unsaturated monomers of the acrylic copolymer (B) are chosen from at least one of acrylate, methacrylate, styrene, (meth)acrylic acid, and vinyl esters.

As noted above, the acrylic copolymer comprises at least one hydroxyl, epoxy, carboxyl, blocked phenol, or acetoacetoxy functional group obtained by copolymerizing ethylenically unsaturated monomers with other acrylate monomers such as methyl acrylate, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate. Examples of carboxy containing monomers include acrylic acid and lower alkyl substituted acrylic acids such as for example, methacrylic acids. Examples of hydroxyl containing monomers include ethylenically unsaturated monomers such as, for example, hydroxyethyl methacrylate, hydroxyethyl acrylate, hydroxyhexyl acrylate, hydroxyhexyl methacrylate, hydroxypropyl acrylate, hydroxypropyl methacrylate, hydroxybutyl acrylate, hydroxylbutyl methacrylate and the like. The ratio of reagents and molecular weights of the resulting acrylic polymer can be chosen to give polymers with an average functionality (for example, the number of OH groups per molecule) greater than or equal to 2 or, in another example, greater than or equal to 4.

The acrylic copolymer may be prepared according to procedures well-known to persons having ordinary skill in the art or can be purchased commercially. For example, commercially available hydroxyl-functional acrylic resins include the MACRYNAL™ series, available from Cytec Surface Specialties, the ACRYLOID™ series, available from Rohm and Haas Company, and the JONCRYL™ series, available from BASF Corporation.

The curable polyester and the acrylic copolymer, typically, are blended together. The weight percent of polyester in the blend is about 2 to about 50 weight percent, based on the total weight of the polyester and acrylic copolymer. Other examples of the amount of polyester in the polyester/acrylic blend are about 5 to about 40 weight percent, and most preferably about 8 to about 30 weight percent.

Our thermosetting coating composition may further comprise about 10 to about 50 weight percent of at least one crosslinker based on the total weight of the curable polyester, the acrylic copolymer, and the crosslinker (components (A), (B), and (C) above). Typically, the crosslinker will be a compound that can react with either the carboxylic acid-terminated or hydroxyl-terminated curable polyester and blends with the acrylic copolymer. For example, crosslinker can comprise at least one compound chosen from epoxides, melamines, hydroxy alkyl amides, isocyanates, and isocyanurates. These crosslinkers and their application to coatings are generally known in the art. For example, epoxide crosslinkers will react with a carboxylic acid-terminated polyester or carboxyl functional acrylic copolymer, whereas melamines, isocyanates, isocyanurates will react with a hydroxyl-terminated polyesters and hydroxyl-functional acrylic copolymers.

Epoxide crosslinkers can include, but are not limited to, at least one epoxide compound chosen from epoxy resins comprising bisphenol A, epoxy novolac resins, epoxy resins containing hydrogenated bisphenol A, epoxy resins containing bisphenol F, triglycidylisocyanurate, and combinations of these crosslinkers. Some examples of commercially available epoxide crosslinkers include those epoxides sold under the EPON™ trademark, available from Hexion Specialty Chemicals, and those sold under the ARALDITE™ trademark, available from Huntsman Advanced Materials.

Melamine or "amino" type crosslinkers also are well-known in the art and can be used in the present invention. Thus, for example, the coating composition of the present invention can comprise at least one melamine compound chosen from hexamethoxymethylmelamine, tetramethoxymethylbenzoguanamine, tetramethoxy-methylurea, and mixed butoxy/methoxy substituted melamines. Examples of commercially available melamine crosslinkers include the CYMEL™300 series and CYMEL™ 1100 series melamine crosslinkers, available from Cytec Surface Specialties.

In addition to epoxides and melamines, isocyanates and isocyanurates can be used as crosslinkers in accordance with the invention. Representative isocyanates and isocyanurates include, but are not limited to, at least one compound chosen from toluene diisocyanate, isocyanurates of toluene diisocyanate, diphenylmethane 4,4'-diisocyanate, isocyanurates of 4,4'-diisocyanate, methylenebis-4,4'-isocyanato-cyclohexane, isophorone diisocyanate, isocyanurates of isophorone diisocyanate, the biuret of 1,6-hexamethylene diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethyl xylene diisocyanate, metaxylene diisocyanate, polyisocyanates, 1,4-butylene diisocyanate, methylene bis(4-cyclohexyl isocyanate), isophorone diisocyanate and isocyanate-terminated adducts of ethylene glycol, 1,4-butylene glycol, and trimethylol propane.

The coating composition can also comprise isocyanate-terminated adducts of diols and polyols, such as ethylene glycol, 1,4-butylene glycol, trimethylol propane, etc., as crosslinkers. These crosslinkers are formed by reacting more than one mole of a diisocyanate, such as those mentioned above, with one mole of a diol or polyol to form a higher molecular weight isocyanate prepolymer with a functionality of 2 to 3. Some commercial examples of isocyanate-terminated adducts include isocyanate crosslinkers under the DESMODUR™ and MONDUR™ trademarks available from Bayer Material Science.

In one embodiment of the invention, the crosslinker comprises at least one aliphatic isocyanate, which can provide good outdoor durability and color stability in the cured coating. Examples of aliphatic isocyanates include 1,6-hexamethylene diisocyanate, 1,4-butylene diisocyanate, methylene bis (4-cyclohexyl isocyanate), isophorone diisocyanate, and combinations thereof. Mixtures of isocyanate crosslinkers can also be employed. In another embodiment, the crosslinker can comprise the isocyanurates of 1,6-hexamethylene diisocyanate, the biuret of 1,6-hexamethylene diisocyanate, or a mixture thereof. In yet another embodiment, the crosslinker can comprise the trimer of 1,6-hexamethylene diisocyanate.

Stoichiometric calculations for the curable polyester and isocyanate reaction are known to those skilled in the art and are described in *The Chemistry of Polyurethane Coatings*, Technical Publication p. 20, by Bayer Material Science, 2005. Persons having ordinary skill in the art will understand that crosslinking between the polyester resin and isocyanate reaches maximum molecular weight and optimal properties associated with molecular weight at an isocyanate:hydroxyl ratio of about 1:1; that is, when one equivalent of isocyanate (—NCO) reacts with one equivalent of hydroxyl (—OH). Typically, however, a small excess of isocyanate, about 5-10%, is used to allow for the loss of isocyanate by the reaction with adventitious moisture from the atmosphere, solvents, and pigments. Other NCO:OH ratios can be used; for example, it may be desirable to vary the NCO to OH ratio to less than 1:1 to improve flexibility or greater than 1:1 to produce harder, more chemical resistant, and more weather resistant coatings.

The coating composition of the present invention typically has an NCO:OH ratio of about 0.9:1.0 to about 1.5:1.0. Examples of other NCO:OH ratios are about 0.95:1.0 to about 1.25:1.0 and about 0.95:1.0 to about 1.1:1.0.

The coating composition also comprises about 10 to about 60 weight percent of at least one solvent, based on the total weight of the curable polyester, acrylic copolymer, crosslinker, and the solvent (components (A), (B), (C), and (D)). Examples of solvents include, but are not limited to, benzene, xylene, mineral spirits, naptha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate (available commercially from Eastman Chemical Co. under the trademark TEXANOL™), or combinations thereof. The coating compositions may also comprise reactive solvents such as, for example, diallyl phthalate, SANTOLINK™ XI-100 polyglycidyl allyl ether (available from Cytec Surface Specialties), and others as described, for example, in U.S. Pat. Nos. 5,349,026 and 5,371,148. Typically, the coating composition of this invention will comprise about 40 to about 90 weight percent solids (i.e., non-volatiles), based on the total weight of the coating composition. Some additional examples of weight percent solids for the coating compostion of the invention are 50, 60, 65, 70, 75, 80, and 85 weight percent.

The coating compositions of the invention, optionally, can further comprise at least one crosslinking catalyst. Representative crosslinking catalysts include carboxylic acids, sulfonic acids, tertiary amines, tertiary phosphines, tin compounds, or combinations of these compounds. Some specific examples of crosslinking catalysts are one or more compounds chosen from p-toluenesulfonic acid, dodecylbenzene sulfonic acid, dinonylnaphthalene sulfonic acid, and dinonylnaphthalene disulfonic acid, benzoic acid, triphenylphosphine, dibutyltindilaurate, and dibutyltindiacetate. The crosslinking catalyst can depend on the type of crosslinker that is used in the coating composition. For example, the crosslinker can comprise an epoxide, and the crosslinking catalyst can comprise at least compound chosen from p-toluenesulfonic acid, benzoic acid, tertiary amines, and triphenylphosphine. In another example, the crosslinker can comprise a melamine or "amino" crosslinker and the crosslinking catalyst can comprise p-toluenesulfonic acid, unblocked and blocked dodecylbenzene sulfonic (abbreviated herein as "DDBSA"), dinonylnaphthalene sulfonic acid (abbreviated herein as "DNNSA") and dinonylnaphthalene disulfonic acid (abbreviated herein as "DNNDSA"). Some of these catalysts are available commercially under the trademarks such as, for example, NACURE™ 155, 5076, 1051, and 5225 (available from King Industries), and BYK-CATALYSTS™ (available from BYK-Chemie USA).

In another embodiment, the curable polyester can comprise hydroxyl-terminated end and the crosslinker can comprise an isocyanates. Examples of isocyanate crosslinking catalysts include FASCAT™ 4202 (dibutyltindilaurate), FASCAT™ 4200 (dibutyltindiacetate, both available from Arkema), DABCO™ T-12 (available from Air Products) and K-KAT™ 348, 4205, 5218, XC-6212™ non-tin catalysts (available from King Industries), and tertiary amines.

In another example, the thermosetting coating composition can comprise about 25 to about 35 weight percent solvent, about 20 to about 35 weight percent of a melamine crosslinker, and a crosslinking catalyst comprising p-toluenesulfonic acid. In yet another example, the thermosetting coating composition comprises about 25 to about 35 weight percent solvent, and about 20 to about 35 weight percent hexamethoxymethylmelamine.

The thermosetting coating composition of this invention may further contain one or more coating additives known in the art. Examples of suitable coating additives include, but are not limited to, at least one of leveling, rheology and flow control agents such as silicones, fluorocarbons or cellulosics; extenders; plasticizers; flatting agents; pigment wetting and dispersing agents; ultraviolet (UV) absorbers; UV light stabilizers; defoaming and antifoaming agents; anti-settling, anti-sag and bodying agents; anti-skinning agents; anti-flooding and anti-floating agents; and corrosion inhibitors. Specific examples of such additives can be found in the *Raw Material Index and Buyer's Guide*, published by the National Paint & Coatings Association, 1500 Rhode Island Avenue, N.W., Washington., D.C. 20005. Some additional examples of such additives may be found in U.S. Pat. No. 5,371,148.

Examples of flatting agents include, but are not limited to, synthetic silica, available from the Davison Chemical Division of W. R. Grace & Company as SYLOID™; polypropylene, available from Hercules Inc., as HERCOFLAT™; and synthetic silicate, available from J. M. Huber Corporation, as ZEOLEX™.

Examples of dispersing agents include, but are not limited to, sodium bis(tridecyl)sulfosuccinate, di(2-ethyl hexyl)sodium sulfosuccinate, sodium dihexylsulfosuccinate, sodium dicyclohexyl sulfosuccinate, diamyl sodium sulfosuccinate, sodium dusobutyl sulfosuccinate, disodium iso-decyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinamate, disodium N-octasulfosuccinamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie USA as ANTI TERRA™. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like. For example, the thermosetting composition can contain BYK 331, available from BYK-Chemie, as a flow and leveling additive.

Several proprietary antifoaming agents are commercially available and include, but are not limited to, BUBREAK™ of Buckman Laboratories Inc., BYK™ of BYK Chemie, U.S.A., FOAMASTER™ and NOPCO™ of Henkel Corp./Coating Chemicals, DREWPLUS™ of the Drew Industrial Division of Ashland Chemical Company, TROYSOL™ and TROYKYD™ of Troy Chemical Corporation, and SAG™ of Union Carbide Corporation.

Examples of UV absorbers, UV light stabilizers, and antioxidants include, but are not limited to, substituted benzophenone, substituted benzotriazoles, hindered amines, hindered benzoates, phenols, and phosphites, some of which are available from Cytec Specialty Chemicals as CYASORB® UV, and from Ciba Specialty Chemicals as TINUVIN®, CHIMASSORB®, IRGANOX® and IRGAFOS®; and diethyl-3-acetyl-4-hydroxy-benzyl-phosphonate, 4-dodecyloxy-2-hydroxy benzophenone, and resorcinol monobenzoate. For example, in one embodiment, the thermosetting coating compositon can contain IRGANOX® 1010 antioxidant, available from Ciba Specialty Chemicals.

The paint or coating additives described above generally form a relatively minor proportion of the coating composition, typically about 0.05 weight percent to about 5.00 weight percent. Although the thermosetting coating compositions of the present invention are primarily intended as non-pigmented clear coats, they may optionally contain one or more pigments in addition to the above-described additives.

For example, an additional aspect of the invention includes solvent borne thermosetting coating compositions that contain one or more pigments. Typical levels of pigment can be about 20 to about 60 weight percent, based on the total weight of the composition. Examples of suitable pigments include those recognized by those of ordinary skill in the art of surface coatings. For example, the pigment may be a typical organic or inorganic pigment, especially those set forth by the *Colour Index*, 3rd ed., 2nd Rev., 1982, published by the Society of Dyers and Colourists in association with the American Association of Textile Chemists and Colorists. Other examples of suitable pigments include, but are not limited to, titanium dioxide, barytes, clay, calcium carbonate, CI Pigment White 6 (titanium dioxide), CI Pigment Red 101 (red iron oxide), CI Pigment Yellow 42, CI Pigment Blue 15,15:1,15:2,15:3,15:4 (copper phthalocyanines); CI Pigment Red 49:1 and CI Pigment Red 57:1. Colorants such as, for example, phthalocyanine blue, molybdate orange, or carbon black also may be added to the coating composition.

The thermosetting coating composition can be applied to any common substrate such as paper; polymer films such as polyethylene or polypropylene; wood; metals such as aluminum, steel or galvanized sheeting; glass; urethane elastomers, primed (painted) substrates; and the like. The coating composition can be coated onto a substrate using techniques known in the art; e.g. by spraying, draw-down, roll-coating, etc. 0.5 to 4 mils of wet coating onto a substrate. The coating can be cured at ambient (room) temperature or heated in a forced air oven to a temperature of about 50° C. to about 175° C., for a time period of 5-120 minutes and subsequently allowed to cool. Thus, a further aspect of the present invention, is a shaped or formed article that has been coated with the coating compositions of the present invention and cured. Further representative examples of typical application and curing methods can be found in U.S. Pat. Nos. 4,737,551 and 4,698,391 and 3,345,313.

A further aspect of the present invention is a thermosetting coating composition, consisting essentially of:

(A). about 2 to about 50 weight percent, based on the total weight of (A), (B), and (C) of a curable polyester, consisting essentially of:
  i. diacid residues, consisting essentially of about 20 to 100 mole percent, based on the total moles of diacid residues, of the residues of isophthalic acid;
  ii. diol residues, consisting essentially of about 20 to 100 mole percent, based on the total moles of diol residues, of the residues of 2,2,4,4-tetramethyl-1,3-cyclobutanediol, and about 80 to about 0 mole percent of the residues of neopentyl glycol; and
  iii. about 2 to about 40 mole percent of the residues of at least one polyol chosen from trimethylolpropane, pentaerythritol, trimethylolethane, erythritol, and dipentaerythritol;
  wherein the curable polyester has a number average molecular weight of about 500 to about 10,000 daltons, a glass transition temperature of about −35° C. to about 80° C., a hydroxyl number of about 20 to about 300 mg KOH/g of polyester, and an acid number of 0 to about 80 mg KOH/g of polyester;

(B). about 25 to about 88 weight percent, based on the total weight of (A), (B), and (C) of at least one acrylic copolymer of ethylenically unsaturated monomers comprising at least one hydroxyl, epoxy, carboxyl, blocked phenol, or acetoacetoxy functional group;

(C). about 10 to about 50 weight percent, based on the total weight of (A), (B), and (C), of at least one crosslinker chosen from epoxides, melamines, isocyanates, and isocyanurates;

(D). about 10 to about 60 weight percent, based on the total weight of (A), (B), (C), and (D) of at least one solvent;

(E). a crosslinking catalyst comprising at least one compound chosen from p-toluenesulfonic acid, dodecylbenzene sulfonic acod, dinonylnaphthalene sulfonic acid, and dinonylnaphthalene disulfonic acid, benzoic acid, triphenylphosphine, dibutyltindilaurate, and dibutyltindiacetate; and (F). at least one coating additive chosen from leveling agents, rheology agents, flow control agents, plasticizers, flatting agents, pigment wetting and dispersing agents, pigments, dyes, ultraviolet light absorbers, ultraviolet light stabilizers; defoaming agents, antifoaming agents, anti-settling agents, anti-sag agents, bodying agents, anti-skinning agents; anti-flooding agents, anti-floating agents, and corrosion inhibitors.

The above thermosetting coating composition is understood to include the various embodiments of the curable polyester, acrylic copolymer, crosslinker, solvent, crosslinking catalyst and coating additives described previously. The phrase "consisting essentially of", as used herein, is intended to encompass thermosetting coating compositions having components (A)-(F) listed above and is understood to exclude any elements that would substantially alter the essential properties of the composition to which the phrase refers. For example, compositions may include other components that do not alter the haze or miscibility of the curable polyester, acrylic copolymer, and solvent. For example, the addition of an additional diol or diacid component, which may alter this miscibility, would be excluded from this embodiment. For example, the addition of 50 mole percent or greater of the residues of a diol or diacid that is known in the art to increase the crystallinity and reduce the miscibility of a polyester polymer would be excluded from this embodiment. Some representative classes of diacids and diols that would be expected to increase crystallinity and reduce miscibility include, but are not limited to, para-substituted aromatic diol or diacid components, multinuclear aromatic diacids or diols, and alicyclic diols and diacids in which the diol and diacid groups have a 1,4 substitution pattern or a "para" relationships to each other. Some examples of diacid and diol components that would be excluded from this embodiment are the residues of terephthalic acid at 50 mole percent or greater, 1,6-naphthalene dicarboxylic acid at 50 mole percent or greater, 1,4-cyclohexanedicarboxylic acid at 75 mole percent or greater, bisphenol A at 50 mole percent or greater, 1,4-cyclohexanedimethanol at 75 mole percent or greater, and hydrogenated bisphenol A at 50 mole percent or greater. All mole percentages are based upon the total moles of diacid or diol residues.

By contrast, some examples of compositions that would be included in the above embodiment are those, for example, wherein the diacid component consists essentially of about 20 to about 80 mole percent of isophthalic acid and about 80 to about 20 mole percent of adipic acid, and the diol component consists essentially of about 20 to 100 mole percent 2,2,4,4-tetramethyl-1,3-cyclobutanediol. In another example, the diacid component can consist essentially of about 30 to about 70 mole percent of the residues of isophthalic acid and about 70 to about 30 mole percent of the residues of adipic acid, and the diol component consists essentially of about 20 to 100 mole percent 2,2,4,4-tetramethyl-1,3-cyclobutanediol. In another example, the diacid component can consist essentially of about 40 to about 60 mole percent of the residues of isophthalic acid and about 60 to about 40 mole percent of the residues of adipic acid. As described previously, the diacid component may further consist essentially of up to 30 mole percent of the residues at least one diacid chosen from phthalic acid, terephthalic acid, tetrachlorophthalic acid, dodecanedioic acid, sebacic acid, azelaic acid, 1,4-cyclohexanedicarboxylic acid, 1,3-cyclohexanedicarboxylic acid, hexahydrophthalic acid, tetrahydrophthalic acid, maleic acid, fumaric acid, succinic acid, 2,6-naphthalenedicarboxylic acid, and glutaric acid. In another example, the coating composition can consist essentially of about 50 to about 100 mole percent of the residues of isophthalic acid, 0 to about 50 mole percent of the residues of adipic acid, about 100 mole percent of the residues of 2,2,4,4-tetramethyl-1,3-cyclobutanediol, and about 10 mole percent of the residues of trimethylolpropane, wherein the curable polyester has a hydroxyl number of about 30 to about 250 mg potassium hydroxide per gram of polyester, an acid number of about 2 to about 15 mg potassium hydroxide per gram of polyester, a Tg of about −20 to about 50° C., and a number average molecular weight of about 700 to about 7000 daltons.

In addition to 2,2,4,4-tetramethyl-1,3-cyclobutanediol, the diol component can consist essentially of up to 50 mole percent of the residues of at least one diol chosen from neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexane-dimethanol, 1,3-cyclohexanedimethanol, 1,4-cyclohexanedimethanol, 2,2,4-trimethyl 1,3-pentanediol, p-xylenediol, hydroxypivalyl hydroxypivalate, 1,10-decanediol, and hydrogenated bisphenol A.

As described previously, the coating composition comprises a non-aqueous solvent (D), which can comprise at least one organic liquid chosen from benzene, xylene, mineral spirits, naptha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, and 2,2, 4-trimethyl-1,3-pentanediol monoisobutyrate. The invention is further illustrated by the following examples.

EXAMPLES

Preparation of Comparative Example Polyester Resins and Resulting Properties—Comparative example polyester resin 1 (indicated as "CE1" in Table 1) was prepared according to the following procedure, targeting a number average molecular weight=2500 daltons and a final acid number=10. The resin was made using conventional fusion processing methods. The resin was prepared in a two-liter reaction kettle equipped with a heating mantle, mechanical stirrer, thermocouple, nitrogen blanket (0.4 scfh), oil-heated partial condenser (103° C.-105° C.), condensate trap, and water-cooled total condenser (15° C.). The kettle top and adapter from the kettle to the column were wrapped in aluminum foil to facilitate water removal. The neopentyl glycol ("NPG") and trimethylolpropane ("TMP") were charged to the reactor and heated from room temperature to 150° C. over sixty minutes to form a homogenous melt. Agitation (300 rpm) was then started, and the isophthalic acid and catalyst were charged and thoroughly mixed to form a slurry. The temperature was increased from 150° C. to 180° C. over 15 minutes, then heated to 235° C. over 360 minutes. The reaction mixture was held at 235° C. until a final acid number of 9±2 mg KOH/g resin was obtained. The resin was then poured into a metal paint can.

Comparative polyester resin examples 2, 3 and 4 (CE2, CE3 and CE4 in Table 1) were prepared according to the following procedure, targeting a number average molecular weight=1250, a hydroxyl equivalent weight=500 g resin/eq OH, a hydroxyl functionality=2.5 and final acid number=8. The resins were made using a solvent process to help remove the water of esterification. The resins were prepared in a two-liter reaction kettle equipped with a heating mantle, mechanical stirrer, thermocouple, nitrogen blanket (0.6 scfh), oil-heated partial condenser (103° C.-105° C.), condensate trap, and water-cooled total condenser (15° C.). The condensate trap, kettle top and adapter from the kettle to the column were wrapped in aluminum foil and fiberglass tape to facilitate water removal. Stage 1 raw materials were charged to the reactor. Additional xylene (approx. 30 g) was used to fill the moisture trap. The temperature was then increased from room temperature to 150° C. over ninety minutes to form a homogenous melt. Agitation (300 rpm) was started and the temperature increased to 230° C. over 240 minutes. The Stage 2 TMP was added when half the theoretical condensate was collected. The reaction mixture was held at 230° C. until a final acid number of 6±2 mg KOH/g resin was obtained. The resin was then poured into a metal paint can.

The acid number, number average molecular weight ("Mn"), and glass transition temperature ("Tg") of each resin were determined and are shown in Tables 1 and 2. Acid number was determined using ASTM method 1639. Hydroxyl number was determined by esterifying the resin by reaction with excess acetic anhydride in pyridine and then decomposing the unreacted anhydride with water. The resulting acetic acid is then titrated with a standard solution of KOH. The milligrams KOH required to neutralize the acetic acid released from one gram of resin sample in the above procedure is reported as the hydroxyl number. Number average molecular weight was determined by gel permeation chromatography (Agilent 1100 Series GPC-SEC system) with a refractive index detector and polystyrene standards.

The Tg of comparative example polyester resin CE1 was determined using a differential scanning calorimeter (Mettler Toledo 821 DSC). The sample was scanned under nitrogen purge from −20° C. to 160° C. on the first heat cycle, cooled from melt, and subjected to a second heat from −20° C. to 160° C. The heating and cooling rate was 20° C./min. The midpoint of the second heat cycle is reported as the Tg of the sample.

For comparative example polyester resins CE2, CE3 and CE4, the Tg of the resin the above procedure was modified to remove residual xylene remaining from solvent processing that could artificially lower the Tg measurement. To obtain a more accurate Tg, a resin sample was first subjected to pre-conditioning in a thermal gravimetric analysis ("TGA") instrument. The resin sample was placed into a stainless steel differential scanning calorimeter ("DSC") pan and heated under nitrogen atmosphere from room temperature to 150° C. at a rate of 5° C./min. The sample was then transferred to a differential scanning calorimeter with modulating capability (TA Instruments Q2000 MDSC with Universal software V4.3A). On the first heating cycle, the sample was heated under nitrogen atmosphere from −120° C. to 125° C. at a rate of 5° C./min and a modulation rate of ±0.796° C./min. Next, it was cooled to −120° C. at 5° C./min and a modulation rate of ±0.796° C./min. For the second heating cycle, the sample was heated under the same conditions as those used in the first heating cycle. The midpoint of the second heating cycle is reported as the Tg of the sample.

TABLE 1

Comparative Example Polyester Resin Formulations (Grams) and Determined Resin Properties

| | Example | | | |
|---|---|---|---|---|
| | CE1 | CE2 | CE3 | CE4 |
| Charge Weights | | | | |
| Stage 1 | | | | |
| NPG(a) | 658.00 | 422.76(b) | 429.74(b) | 440.11(b) |
| TMP(c) | 44.03 | 35.93 | 35.99 | 36.35 |
| IPA(d) | 1029.02 | 647.26 | 526.82 | 338.11 |
| AD(e) | — | — | 115.85 | 297.41 |
| Fascat 4100 catalyst(f) | 1.50 | 1.14 | 1.14 | 1.14 |
| Xylene process solvent | — | 22.75 | 22.8 | 22.88 |
| Stage 2 | | | | |
| TMP | — | 35.93 | 35.99 | 36.35 |
| Total Charge | 1719.67 | 1165.77 | 1168.33 | 1172.35 |
| Minus Theo. Condensate | 218.17 | 137.70 | 140.13 | 143.97 |
| Yield | 1501.50 | 1028.07 | 1028.20 | 1028.38 |
| Determined Resin Properties | | | | |
| AN (mg KOH/g resin) | 7 | 6 | 6 | 5 |
| OH# (mg KOH/g resin) | 39 | 106 | 105 | 102 |
| Mn (daltons) | 3098 | 1988 | 2033 | 1906 |
| Tg (° C.) | 55.6 | 36.8 | 14.5 | −14.0 |

(a)2,2-Dimethyl-1,3-propanediol (Eastman).

(b)Includes a glycol excess of 1 wt. % based on calculated charge weights.

(c)Trimethylolpropane (Perstorp).

(d)Isophthalic acid (Eastman).

(e)Adipic acid (DuPont).

(f)Butylstannoic acid (Arkema).

Preparation of Polyester Resins and Resulting Properties—Example polyester resin formulations E5 through E9 were prepared using a solvent process and the same target resin properties as described for comparative example polyester resins CE2, CE3 and CE4, and are set forth in Table 2. Example polyester resin formulation E10 was prepared using a fusion process and the same target resin properties as described for comparative example polyester resin CE1. Resin properties were determined in the same manner as described for the comparative example polyester resins and shown in Table 2.

TABLE 2

Example Polyester Resin Formulations (Grams) and Determined Resin Properties

| | Example | | | | | |
|---|---|---|---|---|---|---|
| | E5 | E6 | E7 | E8 | E9 | E10 |
| Charge Weights | | | | | | |
| Stage 1 | | | | | | |
| NPG(a) | 313.31(b) | 199.64(b) | 96.02(b) | — | — | 304.70 |
| TMCD(c) | 144.61(b) | 276.42(b) | 398.84(b) | 511.18(b) | 500.89(b) | 421.40 |
| TMP(d) | 36.05 | 36.73 | 36.46 | 36.64 | 36.36 | 40.51 |
| IPA(e) | 323.2 | 309.72 | 297.09 | 285.55 | 446.58 | 948.28 |
| AD(f) | 284.29 | 272.43 | 261.32 | 251.18 | 98.21 | — |
| Fascat 4100 catalyst(g) | 1.14 | 1.13 | 1.13 | 1.12 | 1.12 | 1.50 |
| Xylene process solvent | 22.75 | 22.63 | 22.52 | 22.42 | 22.37 | — |
| Stage 2 | | | | | | |
| TMP | 36.05 | 36.73 | 36.46 | 36.64 | 36.36 | — |
| Total Charge | 1165.98 | 1160.19 | 1154.79 | 1149.84 | 1146.9 | 1702.18 |
| Minus Theo. Condensate | 137.5 | 131.67 | 126.19 | 121.19 | 118.41 | 200.68 |
| Yield | 1028.48 | 1028.52 | 1028.6 | 1028.65 | 1028.49 | 1501.50 |
| Determined Resin Properties | | | | | | |
| AN (mg KOH/g resin) | 5 | 5 | 4 | 5 | 5 | 11 |
| OH# (mg KOH/g resin) | 97 | 98 | 93 | 89 | 93 | 30 |
| Mn (daltons) | 2046 | 2113 | 2138 | 2208 | 2416 | 3772 |
| Tg (° C.) | −8.0 | −1.5 | 5.9 | 14.1 | 43.8 | 78.0 |

(a)2,2-Dimethyl-1,3-propanediol (Eastman).
(b)Includes a glycol excess of 1 wt. % based on calculated charge weights.
(c)2,2,4,4-Tetramethyl-1,3-cyclobutanediol (Eastman).
(d)Trimethylolpropane (Perstorp).
(e)Isophthalic acid (Eastman).
(f)Adipic acid (DuPont).
(g)Butylstannoic acid (Arkema).

Compatibility of Polyester/Acrylic Blends—The polyester resins were evaluated for compatibility with a commercially available acrylic resin, MACRYNAL™ SM 515/70BAC (available from Cytec Surface Specialties). MACRYNAL™ SM 515 is a hydroxy functional acrylic resin that is crosslinkable with aliphatic polyisocyanates, and is suggested by its manufacturer for use in air-drying and forced drying, two pack high solids automotive refinish coatings.

SETAL™ 1603 BA-78 (available from Nuplex Resins) is a commercially available polyester resin with good drying properties and good through-hardening and high hardness in combination with aliphatic polyisocyanates. It is suggested by its manufacturer for use as a co-binder in combination with acrylic resins in two pack high solids clearcoats and solid color topcoats for vehicle refinishes. The acrylic in combination with SETAL™ 1603 serves as an additional comparative example using commercial materials representing current available technology.

A 1:1 blend of polyester and acrylic resins was evaluated at 60 weight % solids in n-butyl acetate. All of the polyester resins were reduced to 70 weight % solids in n-butyl acetate. SETAL™ 1603 is supplied as a 78 weight % solids solution in n-butyl acetate. Additional n-butyl acetate was required to reduce the resin solids to 70 weight %. MACRYNAL™ SM 515 is supplied as a 70 weight % solution in n-butyl acetate. To a 4 oz. jar was added 40.0 g of each 70 weight % solids resin solution. Another 13.3 g of n-butyl acetate was then added to make 93.3 g of a 60 weight % solids blend of the resins. The solutions were rolled at room temperature for about 24 hours to mix the components. Some samples required additional rolling in a steam cabinet at 71° C. (160° F.) to intimately mix the blends. A portion of each polyester/acrylic blend was cast as a 10 mil wet film onto glass and allowed to dry in an oven for 60 min. at 52° C. (125° F.) followed by room temperature drying for 7 days before evaluation.

The compatibility of the polyesters with the acrylic resin was determined by evaluating the solutions with a visual inspection and the dry films by visual inspection and percent haze as measured with a BYK-Gardner haze-gard plus instrument using ASTM method D 1003, Method A, and are shown in Table 3.

TABLE 3

Compatibility of Polyester/Acrylic Resin Blends

| | | Solution Clarity | Film Clarity | | |
|---|---|---|---|---|---|
| PE/A Blend Example | Example Polyester | Visual Appearance | Visual Appearance | % Haze | Compatible? (Yes/No) |
| CE11 | CE1 | opaque, white solid | hazy | 99.80 | no |
| CE12 | CE2 | opaque, white solid | hazy | 99.10 | no |
| CE13 | CE3 | opaque, white solid | hazy | 74.93 | no |
| CE14 | CE4 | clear solution | clear | 0.45 | yes |
| CE15 | SETAL 1603 | clear solution | clear | 0.30 | yes |

TABLE 3-continued

Compatibility of Polyester/Acrylic Resin Blends

| PE/A Blend Example | Example Polyester | Solution Clarity Visual Appearance | Film Clarity Visual Appearance | % Haze | Compatible? (Yes/No) |
|---|---|---|---|---|---|
| E16 | E5 | clear solution | clear | 0.32 | yes |
| E17 | E6 | clear solution | clear | 0.40 | yes |
| E18 | E7 | clear solution | clear | 0.30 | yes |
| E19 | E8 | clear solution | clear | 0.25 | yes |
| E20 | E9 | clear solution | clear | 7.31 | yes |
| E21 | E10 | clear solution | clear | 0.71 | yes |

Comparative example blend CE11 contains a higher molecular weight polyester resin with NPG and 100 mole percent isophthalic acid. Similarly, comparative example blend CE12 contains a lower molecular weight polyester resin with NPG and 100 mole percent IPA content. Both exhibit poor compatibility with the acrylic resin.

In comparative example blends CE13 and CE14, 20 and 50 mole % of the isophthalic acid in the polyester formulation is substituted with adipic acid ("AD"), respectively. Only when the AD level reaches 50 mole % of the diacid component is the NPG polyester compatible with the acrylic resin. As suggested in Nuplex technical literature, the SETAL™ 1603 is compatible with the acrylic resin in comparative example blend CE15.

In examples E16 through E19, the blends contain polyester resins increasing in TMCD content with a constant diacid component of 50:50 molar IPA/AD. All of these polyesters exhibit good compatibility with the acrylic resin.

Example blend E20 contains a TMCD polyester resin with an 80:20 molar ratio of IPA/AD. Unlike the polyester resin in comparative example blend CE13, this polyester exhibits good compatibility with the acrylic resin.

Example blend E21 contains a high molecular weight polyester resin having a 50:50 molar ratio of NPG:TMCD with all IPA as the diacid component (high aromatic acid content). Unlike the polyester in comparative example blend CE11, this polyester is compatible with the acrylic resin.

Clear coat Formulations, Dry Time, Sag Resistance and Hardness Development—Clear polyurethane coatings were prepared and are shown in Table 4. The resins were crosslinked with a 1,6-hexamethylene diisocyanate trimer (Rhodia TOLONATE™ HDT-LV) at a 1.1:1 NCO:OH ratio.

The drying process of a thin film in an open air environment, such as an automotive refinish clear coat, was simulated using an Advanced Rheometrics Expansion System ("ARES") rheometer (available from TA Instruments). This rheological technique used to determine drying behavior as a function of time is described in detail in the *Proceedings of the International Waterborne, High-Solids, and Powder Coatings Symposium* (2004), 31st 221-36, by K. S. Seo, et al. The clear coat formulations in Table 4 were scaled back to one tenth of the amounts listed. Part A components were added to a 4 oz. glass jar and rolled for about 24 hrs. The Part B crosslinker was then added and mixed on a high speed roller for 5 min. A 1-mL Monoject tuberculin syringe (available from Sherwood Medical) was used to transfer about 0.1 mL or 0.2 mL of coating to the rheometer test area, which is a shallow circular trough having a depth of 0.2 mm. Afterwards, the edge of a glass slide was used to smooth the liquid surface. A T-bar having a width of 0.28 mm and a length of 15 mm was then immersed into the liquid. The gap between the bottom of the trough and the lower part of the T-bar was 0.05 mm. A dynamic sweep of the coating was conducted at 25 rad/sec. frequency and 100% strain. The rheology profiles were generated at 76° C.±1° C. and 46%±2% relative humidity. The viscosity data collected for each clear coat is shown in Table 5. The dry time (in minutes) is defined as the point where the clear coat viscosity reaches 4 and are shown in Table 6. Dry times also can be translated into sag resistance of the clear coat. A faster dry time indicates better sag resistance.

Samples for measuring the hardness development of the clearcoats were prepared using the formulations as listed in Table 4. Part A components were added to an 8 oz. glass jar. The materials were rolled for about 24 hours. The Part B crosslinker was then added to Part A and thoroughly mixed on a roller for about 30 minutes before application. A drawdown cup was used to apply a 10 mil wet film onto glass. The clearcoats were then force-dried at 60° C.±2° C. for 20 minutes followed by ambient temperature cure over four weeks. The hardness of the clearcoats was determined after 1, 2, 7, 14, 21 and 28 days at ambient temperature and is shown in Table 6. Hardness was measured with a Tukon microhardness tester at 20× magnification in accordance with ASTM Method D 3363.

The compatibility of the polyesters with the acrylic resin and isocyanate crosslinker in the clear coat formulation is shown in Table 6 and was determined by evaluating the dry films after 60 days by percent haze as measured with a BYK-Gardner haze-gard plus instrument in accordance with ASTM Method D 1003, Method A.

It is desirable that the polyester, when used to replace a portion of the acrylic, have little or no impact on the dry time, sag resistance, hardness development or clarity of the coating. The dry times in Table 6 show that example clear coat E27, containing a TMCD polyester, accelerated the dry time over comparative example clearcoats CE22, CE23 and CE24. Example clearcoats E25 and E26, which contain TMCD polyester resins, improved the dry time relative to comparative example CE23, which contains the commercial Setal polyester. The faster the coating dries also improves the sag resistance property as well.

The Tukon hardness results in Table 6 show that clear coat examples E26 and E27, which contain TMCD polyesters, exhibit early hardness development (over the first 7 days) that is similar to comparative example CE22 and improved over CE23 and CE24. Over a longer term (14 to 28 days), the example clearcoats containing TMCD resins develop hardness similar to comparative example CE22. Comparative example clearcoats CE23 (containing SETAL™ polyester) and CE24 (containing NPG polyester) were the softest clearcoats. All of the clearcoats exhibited good clarity as measured by percent haze (see Table 6).

TABLE 4

Clear coat Formulations (Grams)

| | Clear coat Example | | | | | |
|---|---|---|---|---|---|---|
| | CE22 | CE23 | CE24 | E25 | E26 | E27 |
| | | | Example Resin | | | |
| | Macrynal SM 515 Only | Setal 1603 | CE4 | E8 | E9 | E10 |
| Part A | | | | | | |
| MACRYNAL SM 515/70BAC (70 wt. % in n-BuOAc) (a) | 64.3 | 57.9 | 57.9 | 57.9 | 57.9 | 57.9 |
| SETAL 1603 BA-78 (78 wt. % in n-BuOAc) (b) | — | 5.8 | — | — | — | — |
| Example polyester resin (70 wt. % in n-BuOAc) | — | — | 6.4 | 6.4 | 6.4 | 6.4 |
| DABCO T-12 catalyst (10 wt. % in solvent blend) (c) | 1.0 | 1.0 | 1.0 | 1.0 | 1.0 | 1.0 |
| BYK 331additive (d) | 1.0 | 1.0 | 1.0 | 1.0 | 1.0 | 1.0 |
| IRGANOX 1010antioxidant (10 wt. % in solvent blend) (e) | 1.0 | 1.0 | 1.0 | 1.0 | 1.0 | 1.0 |
| Solvent Blend (n-BuOAc/MAK/MEK/EB Acetate 45:35:15:5) | 8.3 | 8.6 | 9.0 | 9.0 | 9.0 | 10.1 |
| Total Part A | 75.6 | 75.6 | 76.3 | 76.3 | 76.3 | 77.4 |
| Part B | | | | | | |
| TOLONATE HDT LV (100%) (f) | 24.4 | 24.7 | 23.7 | 23.7 | 23.7 | 22.6 |
| Total Parts A + B | 100.0 | 100.0 | 100.0 | 100.0 | 100.0 | 100.0 |

(a) Cytec Surface Specialties.
(b) Nuplex Resins.
(c) Air Products (dibutyltindilaurate).
(d) BYK-Chemie.
(e) Ciba.
(f) Rhodia (aliphatic polyisocyanate HDI trimer).

TABLE 5

Clear coat Viscosity Data

| Time (min.) | Clear coat Example | | | | | |
|---|---|---|---|---|---|---|
| | CE22 | CE23 | CE24 | E25 | E26 | E27 |
| 0.1 | 0.01 | 0.02 | 0.01 | 0.07 | 0.06 | 0.11 |
| 1.1 | 0.01 | 0.02 | 0.01 | 0.07 | 0.06 | 0.16 |
| 2.1 | 0.02 | 0.02 | 0.02 | 0.07 | 0.07 | 0.22 |
| 3.1 | 0.04 | 0.02 | 0.03 | 0.07 | 0.07 | 0.32 |
| 4.1 | 0.06 | 0.03 | 0.05 | 0.07 | 0.07 | 0.41 |
| 5.1 | 0.10 | 0.04 | 0.06 | 0.07 | 0.07 | 0.42 |
| 6.1 | 0.17 | 0.05 | 0.10 | 0.08 | 0.07 | 0.61 |
| 7.1 | 0.23 | 0.07 | 0.15 | 0.08 | 0.08 | 1.02 |
| 8.1 | 0.30 | 0.09 | 0.27 | 0.08 | 0.09 | 1.14 |
| 9.1 | 0.40 | 0.12 | 0.36 | 0.09 | 0.11 | 1.49 |
| 10.1 | 0.66 | 0.16 | 0.48 | 0.10 | 0.13 | 1.75 |
| 11.1 | 0.84 | 0.22 | 0.51 | 0.12 | 0.17 | 1.94 |
| 12.1 | 1.08 | 0.25 | 0.74 | 0.14 | 0.20 | 2.10 |
| 13.1 | 1.20 | 0.26 | 0.94 | 0.17 | 0.24 | 2.34 |
| 14.1 | 1.40 | 0.32 | 1.21 | 0.20 | 0.30 | 2.65 |
| 15.1 | 1.65 | 0.33 | 1.31 | 0.25 | 0.38 | 3.07 |
| 16.1 | 1.85 | 0.51 | 1.64 | 0.30 | 0.43 | 3.41 |
| 17.1 | 2.14 | 0.58 | 1.90 | 0.37 | 0.58 | 3.66 |
| 18.1 | 2.39 | 0.66 | 2.13 | 0.43 | 0.70 | 4.04 |
| 19.1 | 2.70 | 0.85 | 2.40 | 0.54 | 0.86 | 4.46 |
| 20.1 | 2.96 | 1.07 | 2.68 | 0.61 | 1.01 | 4.91 |
| 21.1 | 3.33 | 1.22 | 3.06 | 0.79 | 1.21 | 5.43 |
| 22.1 | 3.79 | 1.29 | 3.49 | 0.95 | 1.53 | 6.09 |
| 22.6 | 4.05 | 1.44 | 3.74 | 1.00 | 1.64 | 6.41 |
| 23.1 | 4.33 | 1.53 | 4.00 | 1.16 | 1.85 | 6.80 |
| 24.1 | 5.03 | 1.70 | 4.69 | 1.39 | 2.10 | 7.69 |
| 25.1 | 5.90 | 1.86 | 5.49 | 1.65 | 2.59 | 8.69 |
| 26.1 | 6.81 | 2.07 | 6.42 | 1.94 | 3.11 | 9.68 |
| 27.1 | 8.03 | 2.22 | 7.54 | 2.32 | 3.53 | 10.84 |
| 27.6 | 8.71 | 2.32 | 8.18 | 2.50 | 3.97 | 11.49 |
| 28.1 | 9.37 | 2.43 | 8.90 | 2.76 | 4.35 | 12.16 |
| 29.1 | 10.83 | 2.63 | 10.30 | 3.24 | 5.13 | 13.41 |
| 30.1 | 12.47 | 2.82 | 11.99 | 3.90 | 6.06 | 14.82 |
| 30.2 | 12.69 | 2.86 | 12.31 | 3.98 | 6.24 | 15.09 |
| 31.1 | 14.28 | 3.04 | 13.77 | 4.47 | 7.09 | 16.30 |
| 32.1 | 16.08 | 3.29 | 15.58 | 5.40 | 8.20 | 17.74 |
| 33.1 | 18.09 | 3.55 | 17.61 | 6.36 | 9.35 | 19.31 |
| 34.1 | 20.16 | 3.86 | 19.73 | 7.39 | 10.75 | 20.88 |
| 34.8 | 21.46 | 4.04 | 21.07 | 8.20 | 11.76 | 21.87 |
| 35.1 | 22.12 | 4.19 | 21.74 | 8.61 | 12.10 | 22.37 |
| 36.1 | 24.21 | 4.55 | 23.89 | 9.91 | 13.72 | 23.94 |
| 37.1 | 26.30 | 4.94 | 26.00 | 11.33 | 15.34 | 25.54 |
| 38.1 | 28.18 | 5.39 | 28.07 | 12.83 | 17.08 | 27.07 |
| 39.1 | 30.17 | 5.89 | 29.94 | 14.40 | 18.84 | 28.50 |
| 40.1 | 32.05 | 6.46 | 31.84 | 16.20 | 20.44 | 29.98 |
| 41.1 | 33.84 | 7.11 | 33.66 | 17.80 | 22.20 | 31.40 |
| 42.1 | 35.45 | 7.76 | 35.43 | 19.55 | 23.92 | 32.71 |
| 43.1 | 37.09 | 8.53 | 36.97 | 21.41 | 25.70 | 34.04 |
| 44.1 | 38.63 | 9.40 | 38.51 | 23.19 | 27.30 | 35.33 |

TABLE 6

Clear coat Dry Time, Hardness Development and Clarity

| | Clear coat Example | | | | | |
|---|---|---|---|---|---|---|
| | CE22 | CE23 | CE24 | E25 | E26 | E27 |
| | | | Example Resin | | | |
| | Macrynal SM 515 Only | Setal 1603 | CE4 | E8 | E9 | E10 |
| Dry Time (min.) | 22.6 | 34.6 | 23.1 | 30.2 | 27.6 | 18.1 |
| Tukon Hardness (Knoops) After | | | | | | |
| 1 Day | 7.3 | 4.9 | 5.9 | 6.0 | 7.1 | 7.5 |
| 2 Days | 8.9 | 6.0 | 7.1 | 7.4 | 8.0 | 8.2 |
| 7 Days | 10.1 | 6.4 | 8.4 | 8.6 | 9.1 | 9.9 |
| 14 Days | 11.1 | 6.5 | 8.6 | 10.0 | 10.0 | 10.4 |
| 21 Days | 11.2 | 6.5 | 8.6 | 10.2 | 10.2 | 10.2 |
| 28 Days | 11.3 | 6.5 | 8.4 | 10.2 | 10.2 | 10.2 |
| Clear coat Clarity After 60 Days (% haze) | 0.24 | 0.27 | 0.24 | 0.20 | 0.21 | 0.84 |

We claim:

1. A thermosetting coating composition, comprising:
(A). about 2 to about 50 weight percent, based on the total weight of (A), (B), and (C) of a curable polyester, comprising
   i. diacid residues, comprising about 30 to about 70 mole percent of the residues of isophthalic acid and about 70 to about 30 mole percent of the residues of adipic acid, based on the total moles of diacid residues;
   ii. diol residues, comprising about 50 to 100 mole percent, based on the total moles of diol residues, of the residues of 2,2,4,4-tetramethyl-1,3-cyclobutanediol; and
   iii. about 3 to about 30 mole percent of the residues of at least one polyol, based on the total moles of diol and polyol residues;
   wherein said curable polyester has a number average molecular weight of about 500 to about 10,000 daltons, a glass transition temperature of about −35° C. to about 100° C., a hydroxyl number of about 20 to about 300 mg KOH/g of polyester, and an acid number of 0 to about 80 mg KOH/g of polyester;
(B). about 25 to about 88 weight percent, based on the total weight of (A), (B), and (C) of at least one acrylic copolymer of ethylenically unsaturated monomers comprising at least one hydroxyl, epoxy, carboxyl, blocked phenol, or acetoacetoxy functional group; and
(C). about 10 to about 50 weight percent, based on the total weight of (A), (B), and (C), of at least one crosslinker comprising at least one compound reactive with a carboxylic acid or a hydroxyl group;
(D). about 10 to about 60 weight percent, based on the total weight of (A), (B), (C), and (D) of at least one non-aqueous solvent.

2. The coating composition according to claim 1 wherein said diacid residues (i) comprise about 40 to about 60 mole percent of the residues of isophthalic acid and about 60 to about 40 mole percent of the residues of adipic acid.

3. The coating composition according to claim 1 wherein said diacid residues (i) further comprise up to 30 mole percent of the residues of at least one dicarboxylic acid chosen from phthalic acid, terephthalic acid, tetrachlorophthalic acid, dodecanedioic acid, sebacic acid, azelaic acid, 1,4-cyclohexanedicarboxylic acid, 1,3-cyclohexanedicarboxylic acid, hexahydrophthalic acid, tetrahydrophthalic acid, maleic acid, fumaric acid, succinic acid, 2,6-naphthalenedicarboxylic acid, and glutaric acid.

4. The coating composition according to claim 1 wherein said diol residues (ii) further comprise up to 50 mole percent of the residues of at least one diol chosen from neopentyl glycol, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexane-dimethanol, 1,3-cyclohexanedimethanol, 1,4-cyclohexanedimethanol, 2,2,4-trimethyl 1,3-pentanediol, p-xylenediol, hydroxypivalyl hydroxypivalate, 1,10-decanediol, and hydrogenated bisphenol A.

5. The coating composition according to claim 1 wherein said polyol residues (iii) comprise the residues of at least one polyol chosen from trimethylolpropane, pentaerythritol, trimethylolethane, erythritol, threitol, dipentaerythritol, sorbitol, and glycerine.

6. The coating composition according to claim 2 wherein said diacid residues (i) comprise about 50 mole percent of the residues of isophthalic acid, about 50 mole percent of the residues of adipic acid; said diol residues (ii) comprise about 50 mole percent of the residues of 2,2,4,4-tetramethyl-1,3-cyclobutanediol; about 50 mole percent of the residues of neopentyl glycol, and said polyol residues (iii) comprise about 10 mole percent of the residues of trimethylolpropane.

7. The coating composition according to claim 1 wherein said diacid residues (i) comprise about 50 mole percent of the residues of isophthalic acid and about 50 mole percent of the residues of adipic acid; said diol residues (ii) comprise about 100 mole percent of the residues of 2,2,4,4-tetramethyl-1,3-cyclobutanediol; and said polyol residues (iii) comprise about 10 mole percent of the residues of trimethylolpropane, wherein said curable polyester has a hydroxyl number of about 30 to about 250 mg potassium hydroxide per gram of polyester, an acid number of about 2 to about 15 mg potassium hydroxide per gram of polyester, a Tg of about −20 to about 50° C., and a number average molecular weight of about 700 to about 7000 daltons.

8. The composition of claim 1, wherein said ethylenically unsaturated monomers of the acrylic copolymer (B) are chosen from at least one of acrylate, methacrylate, styrene, (meth)acrylic acid, and vinyl esters.

9. The coating composition according to claim 1 wherein said crosslinker (C) comprises at least one compound chosen from epoxides, melamines, isocyanates, and isocyanurates.

10. The coating composition according to claim 9 wherein said crosslinker (C) comprises at least one epoxide compound chosen from epoxy resins containing bisphenol A, epoxy novolac resins, epoxy resins containing bisphenol F, and triglycidylisocyanurate.

11. The coating composition according to claim 9 wherein said crosslinker (C) comprises at least one melamine compound chosen from hexamethoxymethylmelamine, tetramethoxymethylbenzoguanamine, tetramethoxymethylurea, and mixed butoxy/methoxy substituted melamines.

12. The coating composition according to claim 9 wherein said crosslinker (C) comprises at least one compound chosen from toluene diisocyanate, isocyanurates of toluene diisocyanate, diphenylmethane 4,4'-diisocyanate, isocyanurates of 4,4'-diisocyanate, methylenebis-4,4'-isocyanatocyclohexane, isophorone diisocyanate, isocyanurates of isophorone diisocyanate, the biuret of 1,6-hexamethylene diisocyanate, 1,6-hexamethylene diisocyanate, isocyanurates of 1,6-hexamethylene diisocyanate, 1,4-cyclohexane diisocyanate, p-phenylene diisocyanate, and triphenylmethane 4,4',4"-triisocyanate, tetramethyl xylene diisocyanate, metaxylene diisocyanate, polyisocyanates, 1,4-butylene diisocyanate, methylene bis(4-cyclohexyl isocyanate), isophorone diisocyanate and isocyanate-terminated adducts of ethylene glycol, 1,4-butylene glycol, and trimethylol propane.

13. The coating composition according to claim 1 wherein said solvent (D) comprises benzene, xylene, mineral spirits, naptha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, 2,2,4-trimethyl-1,3-pentanediol monoisobutyrate, or combinations thereof.

14. The coating composition according to claim 6 which comprises about 25 to about 35 weight percent of said solvent, and about 20 to about 35 weight percent of said crosslinker which consists of hexamethoxy-methylmelamine.

15. The coating composition according to claim 1 further comprising at least one coating additive chosen from leveling agents, rheology agents, flow control agents, plasticizers, flatting agents, pigment wetting and dispersing agents, crosslinking catalysts, pigments, dyes, ultraviolet light absorbers, ultraviolet light stabilizers; defoaming agents, antifoaming agents, anti-settling agents, anti-sag agents, bodying agents, anti-skinning agents; anti-flooding agents, anti-floating agents, and corrosion inhibitors.

16. A shaped object coated with the coating composition of claim 1.

17. A thermosetting coating composition, consisting of:
(A). about 2 to about 50 weight percent, based on the total weight of (A), (B), and (C) of a curable polyester, consisting of:
  i. diacid residues, consisting of about 30 to 100 mole percent, based on the total moles of diacid residues, of the residues of isophthalic acid;
  ii. diol residues, consisting of about 20 to 100 mole percent of the residues of 2,2,4,4-tetramethyl-1,3-cyclobutanediol, and about 80 to about 0 mole percent of the residues of neopentyl glycol, based on the total moles of diol residues; and
  iii. about 3 to about 30 mole percent, based on the total moles of diol and polyol residues, of the residues of at least one polyol chosen from trimethylolpropane, pentaerythritol, trimethylolethane, erythritol, and dipentaerythritol;
wherein said curable polyester has a number average molecular weight of about 500 to about 10,000 daltons, a glass transition temperature of about −35° C. to about 80° C., a hydroxyl number of about 20 to about 300 mg KOH/g of polyester, and an acid number of 0 to about 80 mg KOH/g of polyester;
(B). about 25 to about 88 weight percent, based on the total weight of (A), (B), and (C) of at least one acrylic copolymer of ethylenically unsaturated monomers comprising at least one hydroxyl, epoxy, carboxyl, blocked phenol, or acetoacetoxy functional group;

(C). about 10 to about 50 weight percent, based on the total weight of (A), (B), and (C), of at least one crosslinker chosen from epoxides, melamines, isocyanates, and isocyanurates;
(D). about 10 to about 60 weight percent, based on the total weight of (A), (B), (C), and (D) of at least one nonaqueous solvent;
(E). a crosslinking catalyst comprising at least one compound chosen from p-toluenesulfonic acid, dodecylbenzene sulfonic acid, dinonylnaphthalene sulfonic acid, and dinonylnaphthalene disulfonic acid, benzoic acid, triphenylphosphine, dibutyltindilaurate, and dibutyltindiacetate; and
(F). at least one coating additive chosen from leveling agents, rheology agents, flow control agents, plasticizers, flatting agents, pigment wetting and dispersing agents, pigments, dyes, ultraviolet light absorbers, ultraviolet light stabilizers; defoaming agents, antifoaming agents, anti-settling agents, anti-sag agents, bodying agents, anti-skinning agents; anti-flooding agents, anti-floating agents, and corrosion inhibitors.

18. The coating composition according to claim 17 wherein said diacid residues (i) consist of about 50 to about 100 mole percent of the residues of isophthalic acid and 0 to about 50 mole percent of the residues of adipic acid; said diol residues (ii) consist of about 100 mole percent of the residues of 2,2,4,4-tetramethyl-1,3-cyclobutanedio; and said polyol residues consist of about 10 mole percent of the residues of trimethylolpropane, wherein said curable polyester has a hydroxyl number of about 30 to about 250 mg potassium hydroxide per gram of polyester, an acid number of about 2 to about 15 mg potassium hydroxide per gram of polyester, a Tg of about −20 to about 50° C., and a number average molecular weight of about 700 to about 7000 daltons.

19. The composition of claim 17, wherein said ethylenically unsaturated monomers of the acrylic copolymer (B) are chosen from at least one of acrylate, methacrylate, styrene, (meth)acrylic acid, and vinyl esters.

20. The coating composition according to claim 17 wherein said crosslinker (C) comprises at least one melamine compound chosen from hexamethoxymethylmelamine, tetramethoxymethylbenzoguanamine, tetramethoxymethylurea, and mixed butoxy/methoxy substituted melamines.

21. The coating composition according to claim 17 wherein said crosslinker (C) comprises at least one isocyanate chosen from isocyanurates of 4,4'-diisocyanate, methylenebis-4,4'-isocyanatocyclohexane, isophorone diisocyanate, isocyanurates of isophorone diisocyanate, 1,6-hexamethylene diisocyanate, isocyanurates of 1,6-hexamethylene diisocyanate, 1,4-cyclohexane diisocyanate, polyisocyanates, 1,4-butylene diisocyanate, methylene bis(4-cyclohexyl isocyanate), isophorone diisocyanate and isocyanate-terminated adducts of ethylene glycol, 1,4-butylene glycol, and trimethylol propane.

22. The coating composition according to claim 17 wherein said nonaqueous solvent (D) comprises at least one organic liquid chosen from benzene, xylene, mineral spirits, naptha, toluene, acetone, methyl ethyl ketone, methyl n-amyl ketone, methyl isoamyl ketone, n-butyl acetate, isobutyl acetate, t-butyl acetate, n-propyl acetate, isopropyl acetate, ethyl acetate, methyl acetate, ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, and 2,2,4-trimethyl-1,3-pentanediol monoisobutyrate.

* * * * *